(12) United States Patent
Zaremba

(10) Patent No.: US 6,885,560 B2
(45) Date of Patent: Apr. 26, 2005

(54) PLUGGABLE OPTICAL TRANSCEIVER WITH PUSH-PULL ACTUATOR HANDLE

(75) Inventor: Adam Zaremba, Thousand Oaks, CA (US)

(73) Assignee: Optical Communication Products, Inc., Woodland Hills, CA (US)

(*) Notice: Subject to any disclaimer, the term of this patent is extended or adjusted under 35 U.S.C. 154(b) by 0 days.

(21) Appl. No.: 10/249,249

(22) Filed: Mar. 26, 2003

(65) Prior Publication Data

US 2003/0198029 A1 Oct. 23, 2003

Related U.S. Application Data

(60) Provisional application No. 60/373,898, filed on Apr. 19, 2002.

(51) Int. Cl.[7] .................................... H05K 5/00
(52) U.S. Cl. ............... 361/754; 361/728; 361/732; 439/352; 439/607
(58) Field of Search ................... 361/728, 732, 361/740, 748, 754, 759, 798–801; 439/76.1, 160, 357, 358, 609, 483, 676, 607; 385/92

(56) References Cited

U.S. PATENT DOCUMENTS 6,229,708 B1 * 5/2001 Corbin et al. ............... 361/728
6,343,950 B1 * 2/2002 Eginton et al. ............. 439/540.1
6,430,053 B1 * 8/2002 Peterson et al. ............. 361/728
6,524,134 B1 * 2/2003 Flickinger et al. ........... 439/607
6,530,785 B1 * 3/2003 Hwang ...................... 439/76.1
6,556,445 B1 * 4/2003 Medina ...................... 361/728
2002/0093796 A1   7/2002 Medina
2002/0114141 A1   8/2002 Medina

* cited by examiner

Primary Examiner—Kamand Cuneo
Assistant Examiner—Thanh S. Phan
(74) Attorney, Agent, or Firm—Barlow, Josephs & Holmes, Ltd.

(57) ABSTRACT

A pluggable optical transceiver having a having a slidable actuator assembly for quickly and easily removing the transceiver from a receptacle cage assembly is provided. The actuator assembly includes a curved actuator handle and slide member that can slide in a forward and rearward direction. As force is exerted on slide member, the actuator and slide member slide rearwardly causing the transceiver to become disengaged from the receptacle. In this manner, the transceiver is released and can be removed easily from the receptacle.

11 Claims, 5 Drawing Sheets

PLUGGABLE OPTICAL TRANSCEIVER WITH PUSH-PULL ACTUATOR HANDLE

CROSS REFERENCE TO RELATED APPLICATIONS

This application claims the benefit of U.S. Provisional Application No. 60/373,898 having a filing date of Apr. 19, 2002.

BACKGROUND OF INVENTION

The present invention relates generally to pluggable optical transceivers. Particularly, the invention relates to a push-pull actuator handle for quickly and easily removing a small form factor pluggable (SFP) transceiver from a transceiver-receptacle cage assembly.

Pluggable optical transceivers are known in the art, and have been the subject of various industry standards and sourcing agreements between common vendors. In particular, multiple vendors have entered into a multi-source agreement (MSA) setting forth common standards and specifications for small form factor pluggable (SFP) transceivers. By way of review, an optical transceiver is an integrated fiber optic component including an optical transmitter and an optical receiver. The pluggable transceiver includes a first end with a fiber optic connector and a second end with an electrical connector. For the SFP transceiver, the fiber optical connector is a LC-type duplex connector. The electrical connector is a card edge connector that is received into a female electrical connector housed inside a receptacle. The receptacle assembly is mounted on a daughter card of a host system. A common mechanical and electrical outline for the SFP transceiver is defined by the MSA. However, each individual manufacturer (vendor) is responsible for its own development and manufacturing of the SFP transceiver including developing a method for releasing and removing the transceiver from the receptacle assembly.

The MSA provides some specifications for securing the transceiver to the receptacle cage. Particularly, the MSA specifies a spring-loaded latching tab in the receptacle that engages a standard locking detent on the bottom surface of the transceiver. When the transceiver is slidably inserted into the receptacle, the detent engages the latching tab and the transceiver is physically retained in place by the interlocking engagement of the detent to the latching tab.

Turning to the subject of the present invention, the MSA does not provide any standard mechanisms for releasing and removing the transceiver from the receptacle cage. In this regard, the present invention provides a novel actuator assembly for disengaging the latching tab from the detent, thus allowing a person to easily remove the transceiver from the receptacle.

SUMMARY OF INVENTION

The actuator assembly of the present invention comprises several components. One component is a slide member slidably mounted on the bottom surface of the transceiver. The slide member is located adjacent to a locking detent on the transceiver housing. The slide member has a forward-facing end, a rear-facing end, and two opposing side portions. The rear end of the slide member has angled cam surfaces for selectively engaging the latching tab on the receptacle cage. The forward end of the slide member has an actuator handle projecting therefrom. The actuator handle has a loop structure comprising two lateral (side) segments integrally connected by a curved segment.

The actuator assembly further comprises a pair of opposing cantilevered spring arms, each spring arm extending along a side portion of the slide member. The cantilevered spring arms engage with posts on the housing in two positions, an inner position and an outer position. The posts are formed within a channel on the bottom of the transceiver housing and the spring arms slide between positions forward and rearward of the posts. In the outer position, the angled cam surfaces of the slide member are maintained forwardly of the latching tab so that the latching tab engages the latching detent and the transceiver remains engaged with the receptacle cage. In the inner position, the angled cam surfaces are maintained in a rearward position for engagement with the latching tab of the receptacle cage. Initially, the actuator handle, i.e. spring arms are, are locked in this outer position (spring arms forward of the post) wherein the transceiver module can be locked in the receptacle cage. The slide member remains in this initial locked (outer) position, until sufficient force is applied to the slide member that causes it to slide rearward over the posts and into the inner position wherein the angled cam surfaces engage the latching tab in the receptacle cage.

More specifically, to remove the transceiver from the receptacle cage, a person first pushes on the body of the slide member, thereby causing the slide member to move in a linear direction rearwardly towards the latching tab in the receptacle cage. The angled cam-surfaces of the slide member engage the latching tab causing the locking detent to become disengaged from the opening in the latching tab. The spring arms move of the post and are held in the inner position. In this manner, the transceiver is released from the receptacle cage. After the transceiver is released, kick-out springs in the receptacle cage automatically force the transceiver to slide forward. The user can then pull on the actuator handle to remove the transceiver from the receptacle cage easily and quickly. To re-engage the transceiver, the actuator is snapped back to the outer position an re-inserted into the receptacle.

Among the objects of the instant invention are: providing an optical transceiver module having an integrated actuator assembly; providing an actuator assembly having an actuator handle with a loop structure; providing an actuator assembly that can be pushed and pulled in a linear direction; providing an actuator assembly having a slide member that can engage a latching tab in a receptacle cage to unlock a transceiver module from the cage; and providing an actuator assembly, wherein the profile of the assembly is substantially within the defined dimensions of the transceiver module.

Other objects, features, and advantages of the invention shall become apparent as the description thereof proceeds when considered in connection with the accompanying illustrative drawings.

BRIEF DESCRIPTION OF DRAWINGS

In the drawings which illustrate the best mode presently contemplated for carrying out the present invention.

DETAILED DESCRIPTION

Figure 1:
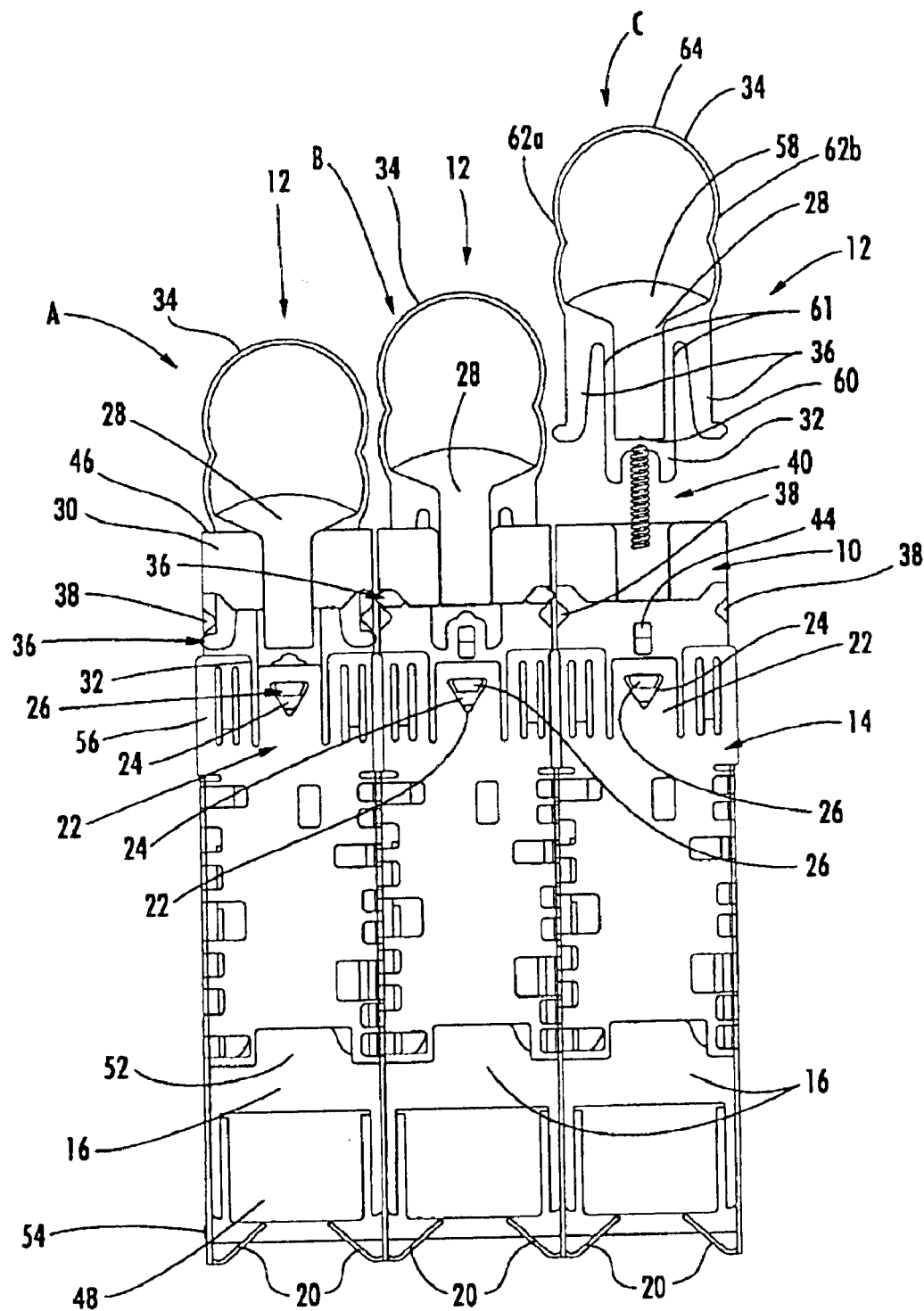
FIG. 1 is a bottom perspective view showing three (3) separate transceiver modules, A, B, and C, inserted in three (3) separate receptacle cages in a side-by-side arrangement, wherein each transceiver has an actuator assembly in accordance with the present invention and the actuator assemblies are shown in different positions.
Figure 2:
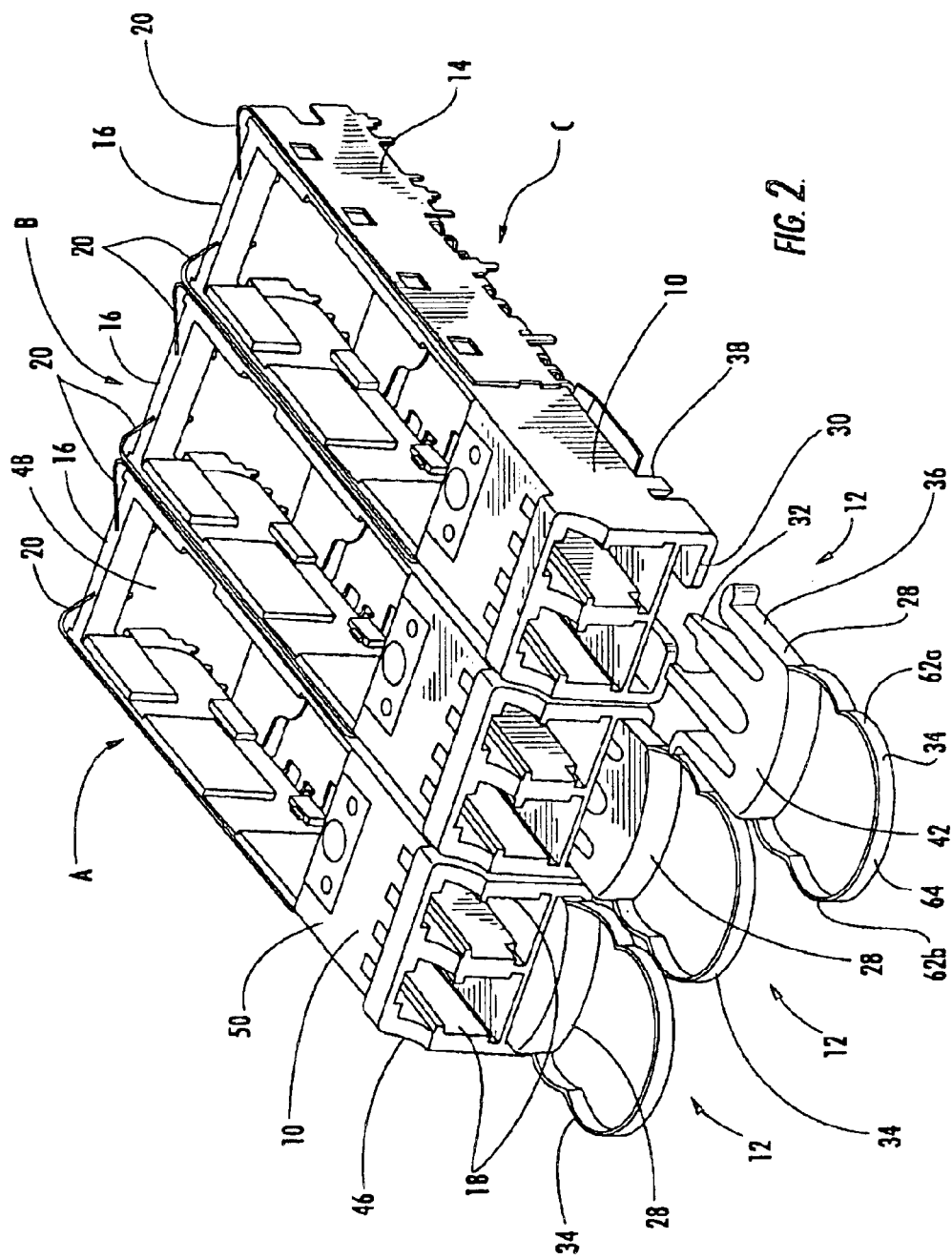
FIG. 2 is a top and side perspective view of the three (3) transceiver modules and receptacle cages illustrated in FIG. 1.

Referring now to the drawings, the pluggable transceiver module of the instant invention is illustrated and generally indicated at 10 in FIGS. 1–5. As will be hereinafter more fully described, the instant small format pluggable (SFP) transceiver module 10 includes an integrated actuator assembly generally indicated at 12 for disengaging the transceiver 10 from a corresponding receptacle cage generally indicated at 14.

Referring to FIG. 1, the optical transceiver module 10 is essentially an integrated fiber optic component including an optical transmitter and optical receiver (not shown). The pluggable transceiver 10 includes a plastic housing frame 16 having a first end 46 with fiber optic connector ports 18 located therein, and an opposite second end 48 with an electrical edge connector (not shown) projecting therefrom. For the pluggable transceiver 10, the fiber optic connector ports 18 are an LC-type duplex connector.

The housing 16 of the transceiver 10 includes an upper (top) surface 50 (FIG. 2) and a lower (bottom) surface 52 (FIG. 1). The bottom surface 52 of the housing 16 includes a slide member 28 and a locking detent 26 as illustrated in FIG. 1. The locking detent 26 secures the transceiver 10 within the receptacle cage 14 as described in further detail below.

The optical transmitter and optical receiver are mounted on a circuit board (not shown) that is received inside the housing frame 16 of the transceiver 10. The rear edge of the circuit board forms the electrical edge connector (not shown). A metallic cover encloses the top surface 50 of housing frame 16 and provides electromagnetic interference (EMI) shielding and case grounding to the chassis ground. A portion of the bottom surface 52 of the housing 16 is enclosed by a separate plastic cover (not shown). The outer dimensions of the male plug end of the LC-type duplex fiber optic cable are standard, and therefore the corresponding female fiber optic connector ports must also be standard dimensions. The first end 46 of the housing frame 16 is generally rectangular, slightly longer side-to-side, when viewed from the front. The width and height of the housing frame 16 are fixed by SFP standards. The two connector ports 18 are symmetrically positioned and arranged within the rectangular outline. Latching surfaces are provided within the connector ports 18 to permit engagement with the standard latch members of the fiber optic cable. The arrangement and operation of the actuator assembly 12 mounted on the first end 46 of the transceiver housing 16 is further described below.

The electrical edge connector is received into a female electrical connector housed inside the receptacle assembly which is in turn mounted on a daughter card of a host system (not shown). The receptacle cage 14 includes kick-out springs 20 located at the rear end 54 of the cage 14 which engage the rear end 48 of the transceiver 10 and bias the transceiver 10 outwardly. A spring-loaded latching tab 22 is located at the open forward end 56 of the receptacle cage 14.

The latching tab 22 includes an opening or aperture 24 therein for locking the detent 26 of the transceiver 10. In FIG. 1, the opening 24 is shown as having a triangular shape, but other designed openings may also be suitable.

During insertion of the transceiver module 10 into the receptacle cage 14, the transceiver 10 slides into the receptacle cage 14 and the locking detent 26 catches and locks with the opening 24 in the latching tab 22. The transceiver 10 is secured to the receptacle 14 by means of locking detent 26 engaging and entering the opening 24 in the latching tab 22. In this manner, the transceiver 10 is locked within the receptacle 14. In FIG. 1, Transceiver "B" is shown locked in the receptacle cage 14. With Transceiver B, the actuator handle 34 has been pulled outwardly, and the actuator assembly 12 is in an outer, locked position. The transceiver 10 and actuator assembly 12 are also shown in an outer, locked position in FIG. 3.

Basically, a person can insert the transceiver module 10 into the receptacle cage 14 by pushing the transceiver 10 into the cage 14 until he or she feels the resistance of the kick-out springs 20 located at the rear of the cage 14. Then, the person should push the transceiver 10 further until feeling the "click" of the detent 26 locking with the opening 24. In the locked position, the cantilever spring arms 36 of the actuator assembly 12 are engaged with post members 38 on the transceiver housing 16 as further described below.

In order to release and remove the transceiver module 10 from the receptacle 14, the transceiver 10 of the present invention includes an actuator assembly 12.

The actuator assembly 12 comprises several components, particularly a slide member 28 and an actuator handle 34.

The slide member 28 is located adjacent to the locking detent 26 on the bottom surface 52 of the transceiver 10. Particularly, the slide member 28 slides within channel structure 30 as shown in Transceiver "C" of FIG. 1 and in FIG. 4. The slide member 28 has a forward-facing end 58, a rear-facing end 60, and two opposing side ends 61 as illustrated in Transceiver C of FIG. 1. The rear end 60 of the slide member 28 has angled cam surfaces 32 which are operative for engaging the latching tab 22 to move the latching tab 22 out of engagement with the detent 26. The forward end 58 of the slide member 28 includes an actuator handle or loop 34 projecting therefrom. The actuator handle 34 has a loop structure comprising two lateral (side) segments 62a and 62b integrally connected by a curved segment 64.

The actuator assembly 12 further comprises a pair of opposing cantilevered spring arms 36, each spring arm 36 being adjacent to a side end 61 of the slide member 28. The cantilevered spring arms 36 engage with triangular posts 38 on the housing in two positions, an inner position, as shown with Transceiver A in FIG. 1 and FIG. 4, and an outer position as shown with Transceiver B in FIG. 1 and FIG. 3. The posts 38 are formed within a channel on the bottom of the transceiver housing 16 and the spring arms 36 slide between positions forward (outer position) and rearward (inner position) of the posts 38. In the outer position (FIG. 3), the angled cam surfaces 32 of the slide member 28 are maintained forwardly of the latching tab 22 so that the latching tab 22 engages the latching detent 26 and the transceiver 10 remains engaged with the receptacle cage 14. In the inner position (FIG. 4), the angled cam surfaces 32 are moved to a rearward position where they engage with the latching tab 22 of the receptacle cage 14 and lift the latching tab 22 out of engagement with the detent 26.

Figure 3:
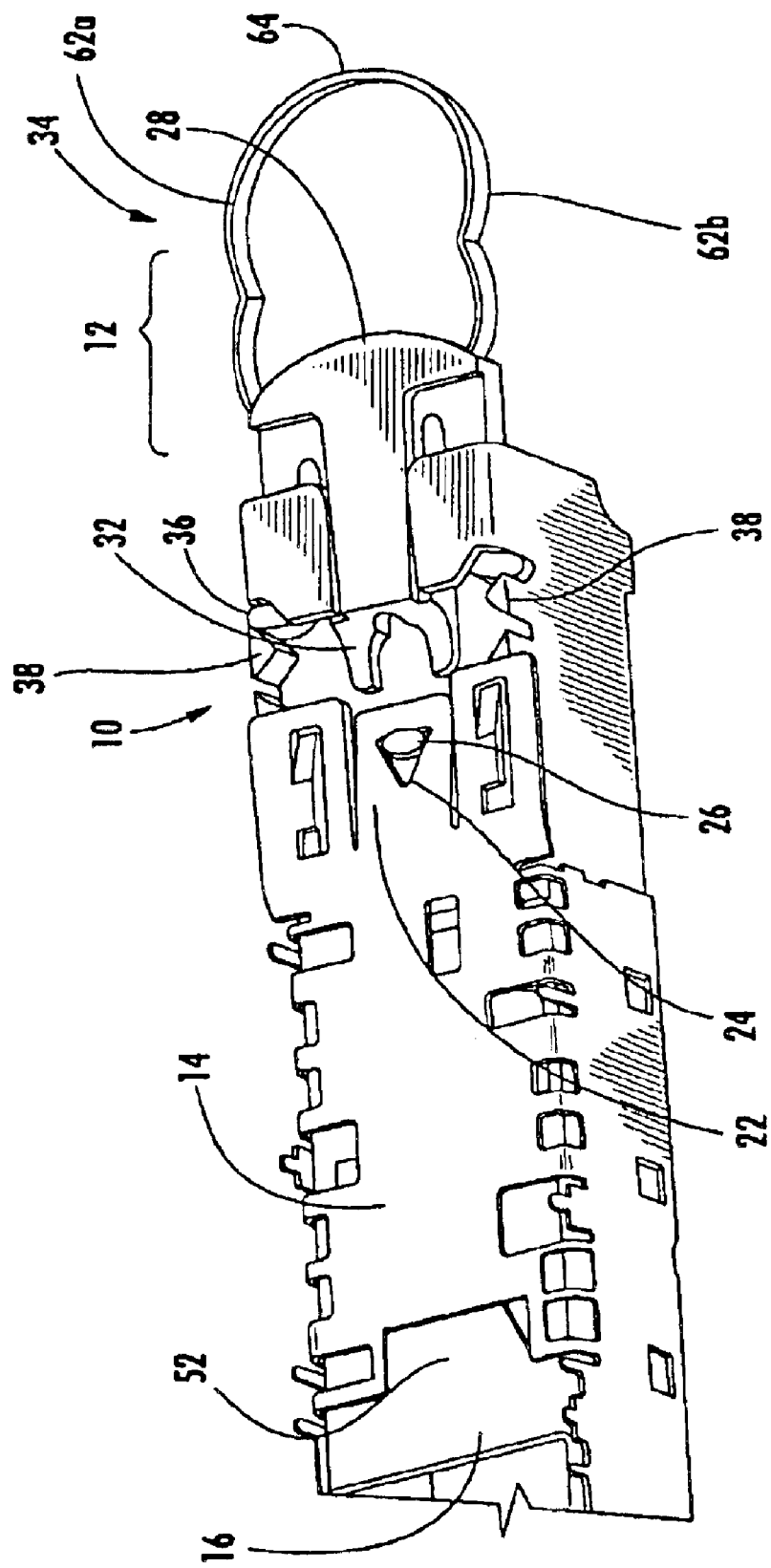
FIG. 3 is a bottom perspective view showing a transceiver module of the present invention in a locked, position in a receptacle cage.

As illustrated in FIG. 3, the transceiver 10 can be locked in the receptacle cage 14 with the actuator assembly 12 in an outer, locked position. The cantilever spring arms 36 are engaged forwardly of the post members 38 on the transceiver housing 16. The slide member 28 remains in this initial locked position until sufficient force is exerted on the slide member 28 to cause it to slide rearwardly or inwardly as further described below.

Figure 4:
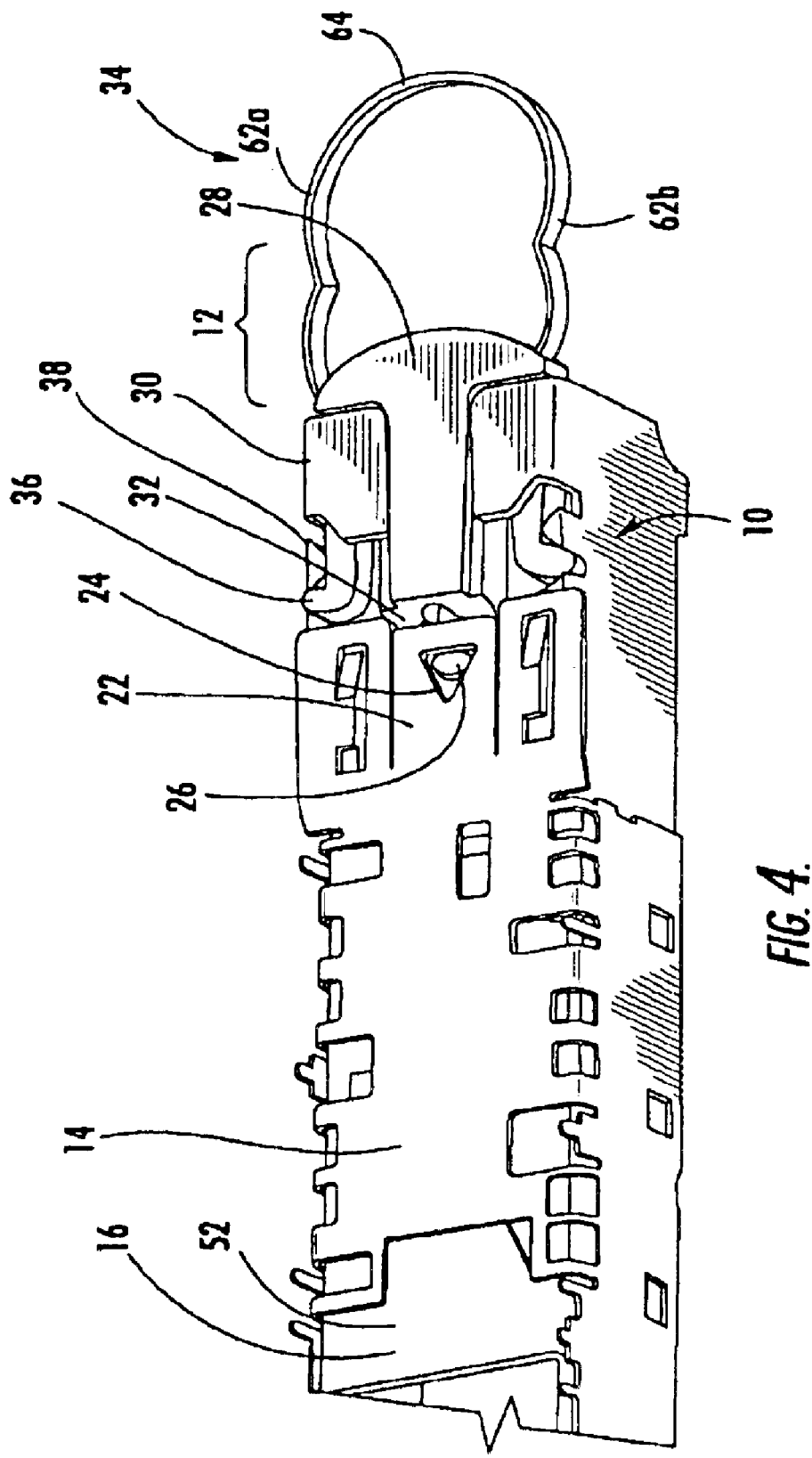
FIG. 4 is a bottom perspective view showing a transceiver module of the present invention in an unlocked position in a receptacle cage.

To remove the transceiver 10 from the receptacle cage 14, a the operator pushes inwardly on the front end 58 of the slide member 28. The force applied to the slide member 28 causes the cantilever spring arms 36 to snap over the posts 38 on the transceiver housing 16 to the rearward or inner position (FIG. 4). The force exerted on the slide member 28 also causes the member 28 to slide in a linear direction rearwardly towards the latching tab 22 in the receptacle cage 14. In this regard, the angled cam surfaces 32 at the rear end 60 of the slide member 28 engage the under surface of the latching tab 22, lifting the latching tab upwardly, and thereby causing the locking detent 26 to become separated from the opening 24 and releasing the transceiver 10 from the receptacle cage 14. In this manner, the transceiver 10 is unlocked from the receptacle cage 14. In FIG. 1, the Transceiver "A" is shown in an unlocked or released position. With transceiver A, the slide member 28 has been pushed inwardly, and the actuator assembly 12 is in an inner, released position. The transceiver 10 and actuator assembly 12 are also shown in an inner, unlocked position in FIG. 4.

With the locking detent 26 and latching tab 22 disengaged, the kick-out springs 20 automatically force the transceiver 10 to spring outwardly. The user can then simply pull on the curved actuator handle 34 to remove the transceiver 10 from the receptacle cage 14.

Figure 5:
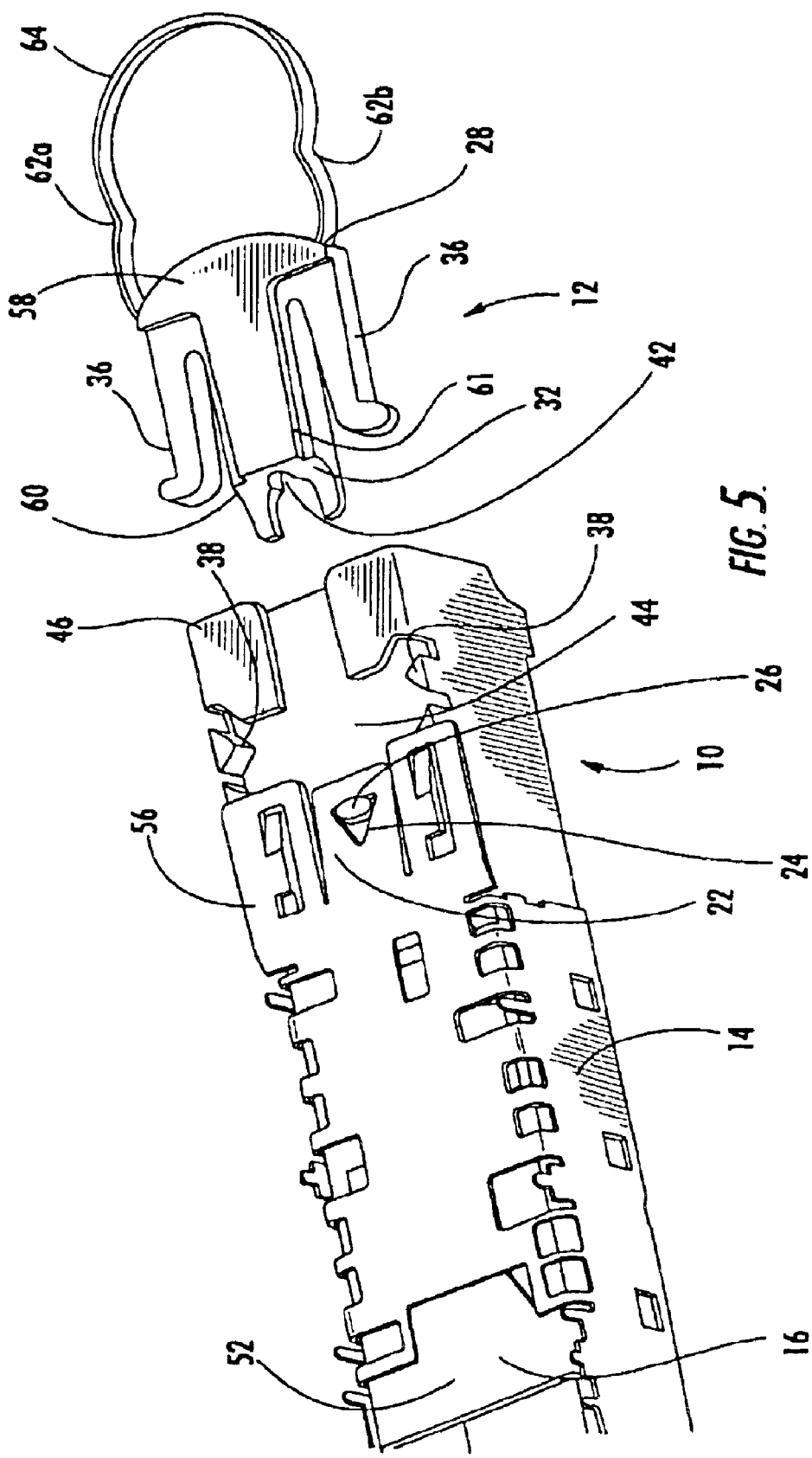
FIG. 5 is an exploded view showing a transceiver module, actuator assembly, and receptacle cage in accordance with the present invention.

As shown in Transceiver "C" of FIG. 1, the actuator assembly 12 further comprises a compression spring 40. The compression spring 40 is captured within a channel 42 within the slide member 28 and a retainer post 44 located on the bottom surface 52 of the transceiver housing 16 as illustrated in FIG. 5. Initially, the transceiver 10 is locked in the receptacle cage 14 with the curved actuator handle 34 and slide member 28 of the actuator assembly 12 in an outer, locked position. When an operator pushes the slide member 28 inwardly and causes the slide member 28 to move in a rearward direction, the compression spring 40 is compressed. The slide member 28 moves and contacts the latching tab 22 in the receptacle cage 14 to disengage the locking detent 26 from the opening 24, thereby releasing the transceiver 10 from the cage 14.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pluggable optical transceiver module, comprising:
    a housing having a first end, an opposing second end, an upper surface, and a lower surface, said lower surface having a locking detent projecting therefrom for engaging an opening in a latching tab located in a receptacle cage; and
    an actuator assembly comprising:
       (i) an actuator handle attached to a slide member, wherein force exerted on the actuator handle causes the handle to slide; and
       (ii) the slide member, which is attached to the actuator handle, the slide member being adapted to slide towards and engage the latching tab in the receptacle as force is applied to the actuator handle, thereby causing the detent to become disengaged from the opening and releasing the transceiver from the receptacle.

2. The transceiver module of claim 1, wherein the actuator handle comprises two side segments integrally connected by a curved segment.

3. The transceiver module of claim 1, wherein the actuator handle and slide member are adapted to slide in a forward and rearward direction.

4. The transceiver module of claim 1, wherein the actuator assembly further comprises a spring biasing means captured within a channel in the slide member so that the spring biasing means compresses as the slide member is pushed to move in a rearward direction.

5. The transceiver module of claim 1, wherein the slide member has an angled surface for engaging the latching tab.

6. The transceiver module of claim 1, wherein the slide member further comprises a pair of opposing cantilevered spring arms.

7. The transceiver module of claim 1, wherein the first end of the transceiver housing has a pair of fiber optic connector ports located therein and the second end of the housing has an electrical edge connector projecting therefrom.

8. The transceiver module of claim 1, wherein a metallic cover encloses the upper surface of the transceiver housing.

9. A pluggable optical transceiver and receptacle package assembly, comprising:
    a receptacle cage for receiving the transceiver, said cage having a first end and an opposing second end, wherein the first end has a latching tab containing an opening therein; and
    a housing having a first end, an opposing second end, an upper surface, and a lower surface, said lower surface having a locking detent projecting therefrom for engaging an opening in a latching tab located in a receptacle cage; and
    an actuator assembly comprising:
       (i) an actuator handle attached to a slide member, wherein force exerted on the actuator handle causes the handle to slide; and
       (ii) the slide member, which is attached to the actuator handle, the slide member being adapted to slide towards and engage the latching tab in the receptacle as force is applied to the actuator handle, thereby causing the detent to become disengaged from the opening and releasing the transceiver from the receptacle.

10. The transceiver and receptacle package assembly of claim 9, wherein the second end of the receptacle cage has a pair of kick-out springs for releasing the transceiver.

11. The transceiver and receptacle package assembly of claim 9, wherein the assembly is mounted on a circuit board.

* * * * *